United States Patent
Chryss et al.

(10) Patent No.: US 10,035,078 B2
(45) Date of Patent: Jul. 31, 2018

(54) SEPARATION METHOD

(75) Inventors: Andrew Chryss, Kensington (AU);
Andreas Monch, Mentone (AU);
Jasbir Khosa, Churchlands (AU);
Matthew Richards, Airport West (AU);
David Freeman, Ferntree Gully (AU)

(73) Assignee: COMMONWEALTH SCIENTIFIC AND INDUSTRIAL RESEARCH ORGANISATION, Campbell (AU)

(*) Notice: Subject to any disclaimer, the term of this patent is extended or adjusted under 35 U.S.C. 154(b) by 583 days.

(21) Appl. No.: 13/695,993

(22) PCT Filed: May 4, 2011

(86) PCT No.: PCT/AU2011/000516
§ 371 (c)(1),
(2), (4) Date: Nov. 2, 2012

(87) PCT Pub. No.: WO2011/137489
PCT Pub. Date: Nov. 10, 2011

(65) Prior Publication Data
US 2013/0052076 A1    Feb. 28, 2013

(30) Foreign Application Priority Data
May 4, 2010   (AU) ................................ 2010901904

(51) Int. Cl.
*C22B 34/12* (2006.01)
*C22C 27/00* (2006.01)
(Continued)

(52) U.S. Cl.
CPC .................. *B01D 1/24* (2013.01); *C22B 9/02* (2013.01); *C22B 9/04* (2013.01); *C22B 34/00* (2013.01);
(Continued)

(58) Field of Classification Search
CPC ............................ C22B 34/12; C22B 34/1295
See application file for complete search history.

(56) References Cited

U.S. PATENT DOCUMENTS 1,594,344 A * 8/1926 Bakken .................. C22B 26/22
75/595
1,814,072 A * 7/1931 Bakken .......................... 75/590
(Continued)

FOREIGN PATENT DOCUMENTS

FR    2 782 932 A1    3/2000
GB    1 321 374    6/1973
(Continued)

OTHER PUBLICATIONS

Why use a screw conveyor? S2S Industries. http://www.s2sindustries.com/about-us/why-use-a-screw-conveyor . Accessed Jul. 28, 2015.*
(Continued)

*Primary Examiner* — Keith Walker
*Assistant Examiner* — Stephani Hill
(74) *Attorney, Agent, or Firm* — John P. White; Cooper & Dunham LLP

(57) ABSTRACT

A process for recovering metal from a process material comprising the metal and a component that is more volatile than the metal, which process comprises:
    transporting the process material in a retort provided in a furnace, the retort being operated under vacuum and at a temperature sufficient to cause sublimation of the component from the process material thereby producing purified metal;
    depositing the component that has been sublimed on a cool surface;
    removing purified metal from the retort; and
    removing deposited component from the cool surface.

8 Claims, 3 Drawing Sheets

Figure 1:
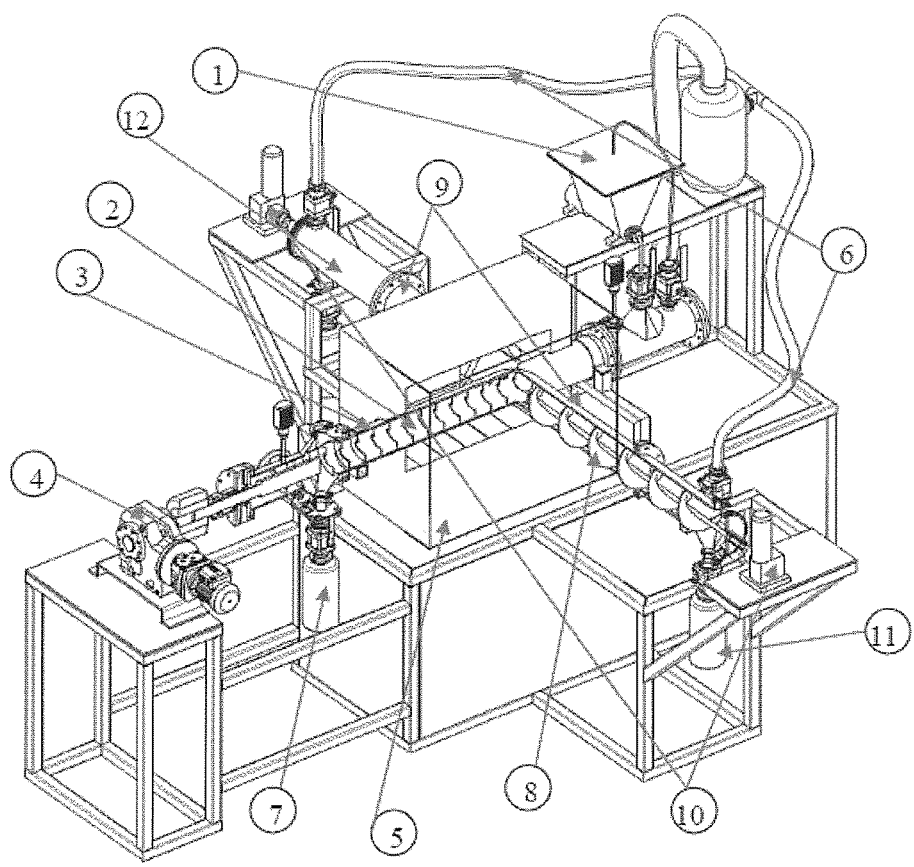

(51) Int. Cl.

| | |
|---|---|
| *C22C 14/00* | (2006.01) |
| *C22C 16/00* | (2006.01) |
| *C22B 34/14* | (2006.01) |
| *B01D 1/24* | (2006.01) |
| *C22B 34/10* | (2006.01) |
| *C22B 34/00* | (2006.01) |
| *C22B 9/04* | (2006.01) |
| *C22B 9/02* | (2006.01) |
| *F27B 17/00* | (2006.01) |

(52) U.S. Cl.
CPC .............. *C22B 34/10* (2013.01); *C22B 34/12* (2013.01); *C22B 34/129* (2013.01); *C22B 34/1263* (2013.01); *C22B 34/1268* (2013.01); *C22B 34/1272* (2013.01); *C22B 34/1295* (2013.01); *C22B 34/14* (2013.01); *B01D 2251/402* (2013.01); *Y02P 10/234* (2015.11)

(56) References Cited

U.S. PATENT DOCUMENTS

| | | | | |
|---|---|---|---|---|
| 2,734,244 | A * | 2/1956 | Herres | ........................... 164/495 |
| 2,878,008 | A * | 3/1959 | Ishizuka | ....................... 266/149 |
| 2,895,823 | A * | 7/1959 | Lynskey | .................. C21D 1/74 266/905 |
| 3,356,491 | A * | 12/1967 | Abraham | .................. C22B 5/04 75/612 |
| 4,749,409 | A | 6/1988 | Ishizuka | |
| 5,078,789 | A | 1/1992 | Abodishish et al. | |
| 5,100,465 | A | 3/1992 | Abodishish et al. | |

FOREIGN PATENT DOCUMENTS

| | | | |
|---|---|---|---|
| GB | 2 140 141 A | 11/1984 | |
| JP | S32-003706 | 6/1957 | |
| JP | S58-210128 | 12/1982 | |
| JP | H05-070855 | 3/1993 | |
| JP | 05148553 A * | 6/1993 | .............. C22B 1/00 |
| JP | H05-148553 | 6/1993 | |
| JP | 2003-320446 | 11/2003 | |
| RU | 2 273 674 | 4/2006 | |
| RU | 2 273 675 | 4/2006 | |

OTHER PUBLICATIONS

General Kinematics. "Batch Processing vs. Continuous Flow." Posted Apr. 24, 2014. Accessed Apr. 1, 2016. https://www.generalkinematics.com/batch-processing-vs-continuous-flow/.*
JP 05-070855 machine translation.*
JP 05-148553 machine translation.*
International Search Report, dated Aug. 15, 2011 in connection with PCT International Application No. PCT/AU2011/000516, filed May 4, 2011.
Notification Concerning Transmittal of International Preliminary Report on Patentability (Chapter I of the Patent Cooperation Treaty), including an International Preliminary Report on Patentability and Written Opinion of the International Searching Authority, dated Nov. 15, 2012 by the International Bureau of WIPO in connection with PCT International Application No. PCT/AU2011/000516, filed May 4, 2011.
Mar. 15, 2017 Communication, issued in connection with European Patent Application No. 11777029.7.
English translation of Apr. 7, 2015 Office Action, issued in connection with Japanese Patent Application No. 2013-508330.
Jul. 2, 2015 Amended Claims, filed in connection with Japanese Patent Application No. 2013-508330.
English translation of Sep. 8, 2015 Office Action, issued in connection with Japanese Patent Application No. 2013-508330.
Notice of Rejection dated Mar. 30, 2015 in connection with Japanese application No. 2013-508330 (English translation).
Notice of Rejection dated Sep. 2, 2015 in connection with Japanese application No. 2013-508330 (English translation).

* cited by examiner

SEPARATION METHOD

CROSS-REFERENCE TO RELATED APPLICATIONS

This application is a § 371 national stage of PCT international Application No. PCT/AU2011/000516, filed May 4, 2011, claiming priority of Australian Patent Application No. 2010901904, filed May 4, 2010, the contents of each of which are hereby incorporated by reference in their entirety.

The present invention relates to a process for purifying certain metals and to a reactor for performing the process. The invention also relates to a metal when purified by the process of the present invention.

Various methodologies exist for the production of metals such as titanium, hafnium, zirconium, and the like. Invariably, the metal is produced in a form that requires further treatment in order to isolate/purify the metal. For example, and broadly speaking, one production approach involves the chemical reduction of a salt of the metal with a suitable reducing agent. This yields a reaction product (hereinafter termed "process material") that typically includes the elemental form of the metal, the corresponding salt of the reducing agent salt and, possibly, excess reducing agent. It is then necessary to separate/isolate the elemental form of the metal. On a commercial scale this tends to be done by vacuum distillation that is conducted as a batch operation, possibly taking days.

It would be desirable to provide a new process that allows metal to be recovered from a process material including the metal and species that are more volatile than metal. It would be particularly desirable to provide a process that enables metal to be recovered from such process materials on a continuous basis.

Accordingly, the present invention provides a process for recovering metal from a process material comprising the metal and a component that is more volatile than the metal, which process comprises:
transporting the process material into a retort provided in a furnace, the retort being operated under vacuum and at a temperature sufficient to cause sublimation of the component from the process material thereby producing purified metal;
depositing the component that has sublimed on a cool surface;
removing purified metal from the retort; and
removing deposited component from the cool surface.

Herein the term "retort" is intended to denote a vessel or chamber in which one or more relevant phase transformations take place as required in accordance with the principles of the invention.

Advantageously, the process of the present invention can be operated on a continuous basis with "fresh" process material being supplied continuously to the retort (and furnace) with purified metal and deposited volatile component(s) being removed continuously also. The process of the present invention is implemented in a single piece of equipment/reactor provided with various components connected to each other as required. This means for example that process material is fed into the reactor and metal and deposited component removed from the reactor. This also means that the requisite sublimation and deposition transformations take place in functionally designed components of the same reactor.

Central to the present invention is the sublimation and deposition of volatile component(s) from the process material within the same (single) reactor. Herein the term "volatile component(s)" is intended to denote one or more lower boiling point species that are present in the process material as a result of the reaction by which the process material has been produced. The nature of the volatile component(s) will obviously depend upon how the process material has been produced.

Taking into account the principles underlying the present invention as described herein, the process of the invention is believed to have applicability to recovery of metal from a broad range of reaction and/or contaminated process materials. That said, the present invention has particular applicability to the recovery of metal from a process material comprising the metal and one or more volatile salts of another metal. Thus, the invention may be applied to recover metal from a process material that has been produced by reduction of a salt of the metal with a reducing agent. In this case the volatile component(s) will be the salt of the reducing agent used in the reduction reaction and, possibly, the reducing agent itself if the latter is used in excess in the reduction reaction.

The term "metal" as used herein may mean one or more elemental metals, one or more metal alloys, or a combination of elemental metal(s) and alloy(s). The nature of the metal that is present in the process material may vary depending upon the reaction by which the process material is produced and the reactants involved.

In one embodiment the process material includes a single elemental metal or metal alloy in combination with one or more volatile components. In more complex process materials a number of metals and/or metal alloys may be present and in this case further process steps may need to be implemented after the process of the present invention in order to isolate particular metal(s)/metal alloy(s) of interest, if this is desired. The nature of the volatiles present will vary from process material to process material (and possibly between batches of the same type of process material) and it may not be possible to remove volatiles to the desired extent in a single application of the process of the invention. The process of the invention may therefore need to be applied a number of times to achieve successive removal of volatiles from a process material.

The process of the present invention can receive process material directly from an upstream reactor in which the requisite reaction takes place (to generate the metal-containing process material). Alternatively, the process of the present invention can be operated as a stand-alone process. In either case the process of the invention may be operated in a continuous manner.

The process material for use in the present invention must be in particulate form and the particle size may influence the efficiency at which the process may be implemented. The particle size will influence the flowability of the process material and the ease with which it may be transported in the retort and through (the hot zone of) the furnace. The particle size may also influence the extent and rate of release of volatile component(s) from the process material. The particle size can be optimised accordingly, and this may involve adjustment of the particle size of the process material, such as by communition, prior to use in the present invention. The residence time within the hot zone can also be varied to accommodate changes in particle size.

Preferably, the process of the present invention is implemented under conditions of temperature and pressure, and on selected metal-containing process materials, such that volatile component(s) are caused to sublime in the sublimation step.

Sublimation of an element or compound is a transition from a solid to gas phase with no intermediate liquid stage. Sublimation is an endothermic phase transition that occurs at pressures below and temperatures above the triple point (the triple point of a substance is the temperature and pressure at which three phases, in this case gas, liquid, and solid, of that substance coexist in thermodynamic equilibrium.). At atmospheric pressure most chemical compounds possess three different states at different temperatures. In these cases the transition from the solid to the gaseous state requires an intermediate liquid state. The reverse process of sublimation is termed deposition.

Advantages of using a sublimation process are derived from the lower temperatures involved which allow for more standard materials of construction to be used. Generally sublimation processes are driven by the vapour pressure difference, and higher temperatures produce higher vapour pressures. Operating the process at lower pressures (below the triple point) still maintains a vapour pressure difference but at a lower temperature.

The use of the present process for separating different species by sublimation requires the changing of temperature and pressure conditions to exceed the temperature of the triple point and to be below the pressure of the triple point. For example, to cause sublimation of sodium chloride (NaCl) would require a temperature above 800° C. and a pressure below 0.05 kPa. One skilled in the art will be able to select suitable operation conditions for implementation of the invention as intended.

It is possible that distillation may play a role in the present invention, although it can sometimes present a problem to have liquid species present due to possible fouling problems.

Volatile species that have sublimed off from the process material come into contact with a cool surface where they are deposited. In this context the term "cool" means that, under the prevailing pressure conditions, the surface is at a temperature that will lead to deposition of volatiles. The surface upon which deposition takes place may be actively cooled but this is not mandatory. The surface may be sufficiently cool simply by virtue of its position in the reactor. The surface may take any form but preferably it has a high surface area as this will lead to increased deposition. As the process of the invention proceeds the cool surface may become coated with deposited material and it may be necessary to remove such material from the surface in order to maintain deposition efficiency. Thus, the surface may be cleaned/scraped during implementation of the process of the invention.

An important aspect of the present invention is the way in which the process material is transported into and through the hot zone. In a preferred embodiment this is done using a retort with process material being conveyed through the retort using a screw. In the context of the present invention this screw is referred to as the "sublimation screw" and the retort the "sublimation retort". Process material is fed onto the surface of the sublimation screw via a suitable entry port in the sublimation retort. In practice process material feed onto the screw will be metered taking into account the operating characteristics of the process.

Typically, process material is delivered onto the sublimation screw in a region outside the hot zone of the reactor. The hot zone is the region where the temperature is sufficiently high for sublimation of volatiles to take place. In practice this will be within the furnace component of the reactor. Rotation of the sublimation screw within the sublimation retort will transport process material into the hot region of the reactor. In practice as process material is transported along the sublimation retort it will encounter increasing temperatures and this will lead to gradual sublimation of volatiles. The rate at which product needs to be transported along the sublimation retort will vary based upon such factors as the morphology of the feed material, the temperature gradient encountered, the length of the region in the reactor where sublimation takes place, the loading of process material on the sublimation screw cm turn this will be influenced by screw dimensions and characteristics), and the like. The use of a non-steady screw speed or a reversing of the screw direction may be employed to improve the transport of the product.

In this embodiment, as well as a sublimation screw/sublimation retort arrangement for transporting process material through the hot zone for sublimation, a smaller diameter screw/retort arrangement may be used for deposition of volatiles that are produced by sublimation. Herein this arrangement is termed the "deposition screw" and "deposition retort". In an embodiment of the invention the deposition screw/deposition retort arrangement may extend into the sublimation screw from either end of the sublimation screw. To facilitate this, the sublimation screw may be a shaftless screw. With temperature in mind, it may be desirable for the deposition screw/deposition retort to extend into the sublimation screw from the cool end of the sublimation screw.

It is intended that volatile component(s) (also referred to herein simply as "volatiles") will be cooled and deposit on the inner surface of the deposition retort and that deposited material will be transported along the deposition retort (away from the sublimation retort) by rotation of the deposition screw. In one embodiment the sublimation screw transports process material in a direction opposite to the direction in which deposited material is transported, but this is not mandatory. The sublimation screw is intended to transport process material from a relatively cool region into a region of the reactor where sublimation can take place. In contrast the deposition screw is intended to transport volatiles that have cooled and been deposited (hereafter "deposited material") away from the sublimation retort to avoid re-sublimation.

In the embodiment described above the deposition retort/deposition screw arrangement is essentially concentric with the sublimation retort/sublimation screw arrangement. However, this not mandatory. Thus, the retort may be a tubular member with the screw being provided within the tubular member, rotation of the screw transporting process material along the inside of the tube. However, another embodiment the deposition retort is provided so that it intersects the sublimation retort. In this case the inlet end of the deposition retort communicates with an exit port provided on the outer surface of the sublimation retort.

The deposition retort may intersect the sublimation retort at some angle between the respective axes of the retorts. In this embodiment multiple deposition retorts may be used at selected locations along the length of the sublimation retort.

In this embodiment the deposition retort may include a conventional screw as deposition screw for scraping deposited process material off the inner surface of the deposition retort and transporting deposited material along the deposition retort for discharge through a suitably located outlet port.

In another embodiment the deposition retort may include an elongate member extending into the retort upon which volatiles may condense. In this case the deposition retort will also require some means for scraping deposited material from the inner surface of the deposition retort and from the outer surface of the elongate member. A scraper may be used in this regard with the scraper moving in the space between the inner surface of the deposition retort and the outer surface of the elongate member. The scraper may take the form of one or more screws that rotate in the annular space between the inner surface of the deposition retort and the outer surface of the elongate member. (The scraper or screws) transport deposited material for discharge at a suitable positioned discharge port.

A vacuum is applied to the reactor through the deposition retort. In this regard vacuum applied through the deposition retort preferably has the effect of entraining sublimed vapours into the deposition retort. Deposited material may be removed from the deposition retort using a suitably positioned discharge port.

The reactor may be flushed with an inert gas to avoid detrimental effects due to the presence of air. The inert gas may also be used to control flow of volatiles within the sublimation retort so that the volatiles are suitably directed to the site of intended deposition.

Noting the prevailing pressure conditions, to achieve deposition of volatiles the inner surface of the deposition retort must be at a suitably low temperature. As noted the deposition retort is located away from the hot zone and this will certainly help in reducing the temperature of the inner surface of the deposition retort. Cooling means may however be required in order to maintain the deposition retort at a suitable temperature. A cooling sleeve may be used to cool the deposition retort, or at least a region thereof.

When implementing the process of the invention care needs to be taken to avoid blocking of the sublimation screw/sublimation retort and deposition screw/deposition retort arrangement. Blocking of the sublimation screw/sublimation retort can be prevented by suitable control of the feed characteristics of the process material onto the sublimation screw, including feed particle size and volume feed rate. The sublimation screw characteristics may also be relevant to avoiding blocking, including the pitch of the screw threads and the lands surface area. The rotational speed of the sublimation screw may also be influential. A periodic speed and direction change can also prevent build-up of process material on the screw.

Similarly, the characteristics of the deposition screw and/or the speed at which it is rotated may influence blocking of the deposition screw/deposition retort arrangement. The temperature profile along the deposition retort may also have an impact on whether blocking occurs. To avoid blocking it may also be beneficial in some embodiments for the deposition screw to be slightly longer than, and thus extend beyond the end of, the deposition retort.

It may also be the case that the sublimation screw and/or deposition screw have some limited flexibility and flexing of the screw(s) may also help to inhibit blocking of material between the screw and inner surface of the retort. One or both retorts may also be fitted with a scraper to remove any material that becomes adhered to the inner surface of the retort.

The process of the invention may be applied to the recovery of a variety of metals that are present in a process material. The invention may have particular utility to the recovery of titanium, zirconium and hafnium, from reduction reaction products including these metals, reduction reaction by-products and, possibly, excess reducing agent. The invention may be especially useful for the recovery of metal from the product formed by reduction of the corresponding metal salt, typically the chloride, with a suitable reducing agent. By way of example, the invention may be applied to recover titanium from a process material produced by reduction of titanium tetrachloride with magnesium. In this case the process material may be a titanium-containing sponge or particle that also contains magnesium chloride and, possibly, unreacted magnesium. One skilled in the art will understand that similar process materials are produced during production of other metals, such as zirconium and hafnium.

The temperature and pressure at which the process of the invention is operated should be controlled carefully. The temperature and pressure should be selected to achieve suitably high kinetics (sublimation) whilst avoiding sintering problems. The materials of construction and the temperature at which componentry, such as valves, may be operated will, however, also influence the operating temperature employed. It is also desirable to avoid formation of liquid phases in the reactor. For example, based on Ti/MgCl$_2$ separation, the optimum temperature is about 850° C. and the optimum pressure is 0.01 kPa. Above 0.02 kPa, liquid magnesium chloride forms and this can lead to blockage problems. At a temperature below 750° C., separation is difficult as the separation kinetics are very slow. In contrast, above 950° C. sintering of metals such as titanium may occur and this can also lead to blockages.

In an embodiment of the invention purified metal produced in accordance with the process of the invention as described may be subjected to repeated processing using the process of the invention in order to remove further volatiles and lead to enhanced purity. Thus, the process may be operated in modular fashion with metal purity increasing per processing module.

The present invention also provides a reactor for carrying out the process of the invention as described.

In an embodiment the reactor comprises:
a furnace;
a retort extending into and through the furnace, the retort comprising an inlet for delivery of process material into the retort and an outlet for the removal of metal from the retort after sublimation of volatiles from the process material;
a surface for deposition of volatiles that have sublimed from the process material, the surface comprising an inlet for receiving volatiles from the retort and an outlet for removal of deposited volatiles from the surface.

The retort will include a mechanism for transporting process material from the inlet along the retort and into the hot zone of the reactor, and a mechanism for transporting process material from which volatiles have sublimed to the outlet of the retort.

The surface will also include a mechanism for transporting deposited volatiles to the outlet of the surface.

The reactor will also include collectors, such as canisters, for receiving process material from which volatiles have been removed and deposited volatiles.

The reactor will also include ancillary components as required. For example, the reactor will include one or more vacuum pumps to allow the reactor to be operated under vacuum.

Additional features of the reactor will be apparent from the foregoing discussion of the invention and from the accompanying non-limiting figures.

In a preferred embodiment the retort takes the form of a sublimation retort, including a sublimation screw, and the surface for deposition of volatiles takes the form of a deposition retort, including a deposition screw. These components are as described above with one embodiment also being illustrated in the figures. As explained though the design of the deposition retort and deposition screw(s) may vary.

Figure 2:
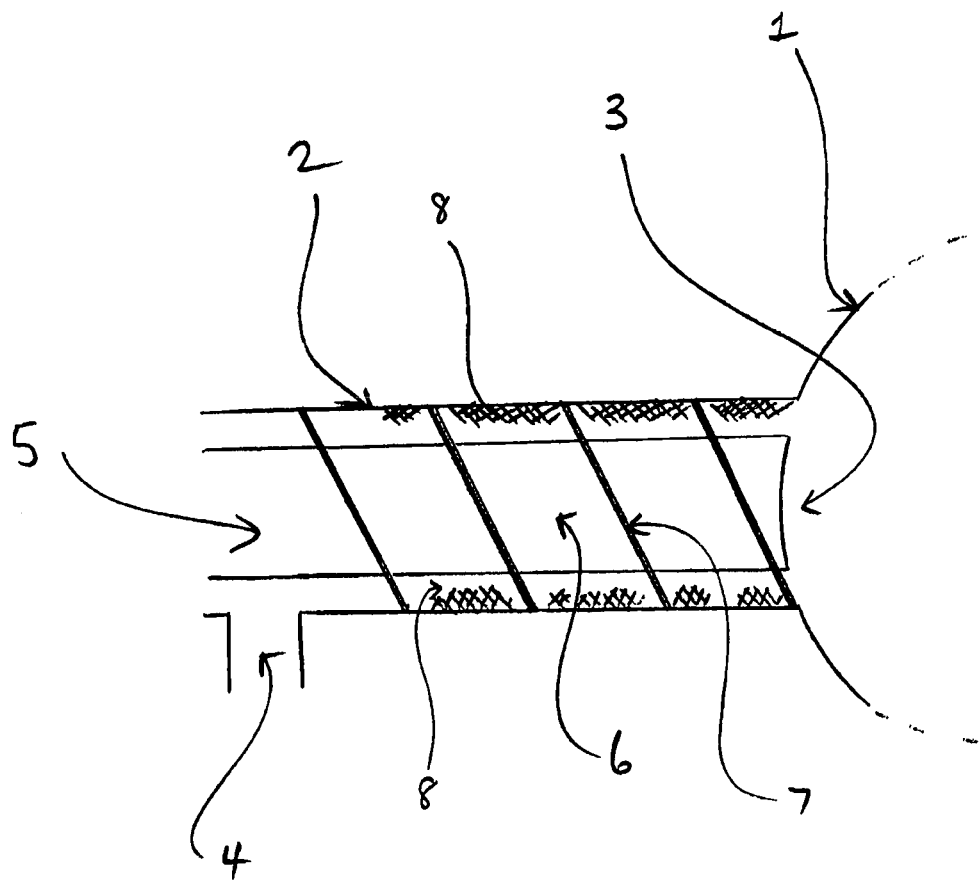
Figure 3:
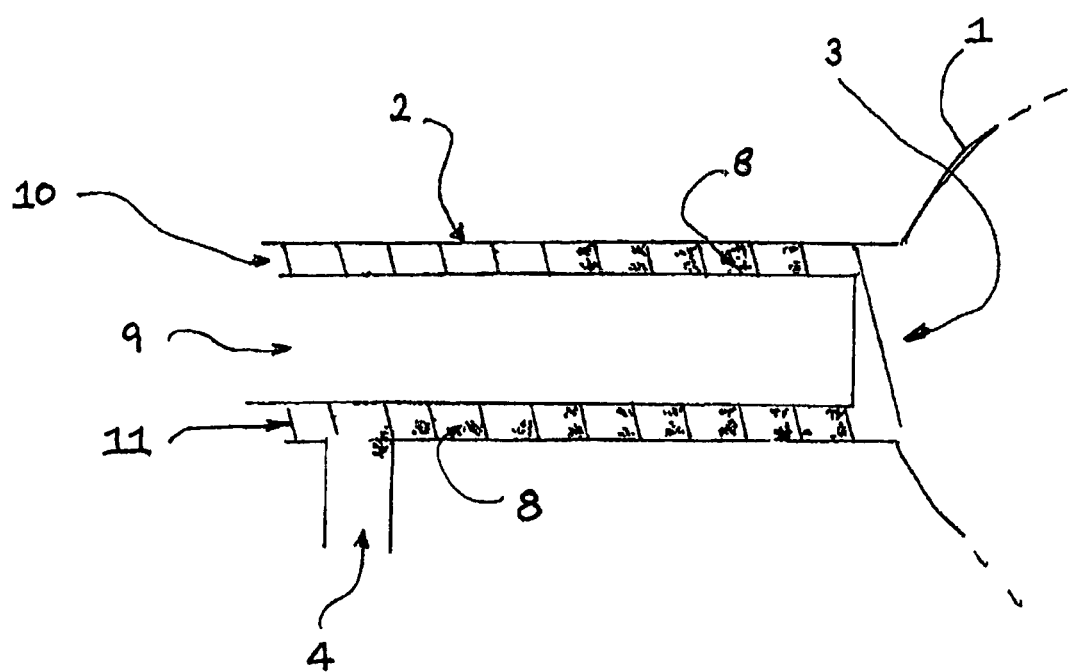

Embodiments of the invention are illustrated in the accompanying non-limiting figures in which:

FIG. 1 is a schematic illustrating a reactor in accordance with the present invention; and FIGS. 2 and 3 are schematics illustrating componentry that may be used in a reactor in accordance with the present invention.

The figures are schematics only and are not limiting with respect to relative proportions and dimensions.

The figures will be discussed for the purposes of illustration only with reference to the processing of titanium-containing process material produced by the reduction of titanium tetrachloride with magnesium. The process material may be produced as described in Applicant's published International patent application WO2006/042360 entitled "Low temperature industrial process". The process material takes the form of composite particles in which titanium particles are embedded in a matrix of $MgCl_2$. The invention is not restricted to implementation using this type of product however.

FIG. 1 illustrates a reactor including a cannister/hopper (1) for feeding the process material onto the surface of a sublimation screw (2) via an inlet port. Feeding of the composite particles may be metered using valves. The sublimation screw (2) is provided within a sublimation retort (3) that takes the form of an elongated tube. Rotation of the sublimation screw (2) will have the effect of transporting the process material. The sublimation screw (2) is a shaftless screw rotated by a drive (4) located at one end of the screw.

The sublimation retort (3) extends into a furnace (5) that has a maximum temperature (at a zone remote from the location at which process material is delivered onto the sublimation screw (2)) of about 1050° C. The sublimation retort (3) may be subjected to a vacuum via vacuum line (6) and is typically operated between 0.01 and 0.015 kPa. The apparatus is typically flushed with a purge gas (argon, for example) to keep air out of the apparatus during operation.

At the end of the sublimation screw (2) remote from the end that receives process material there is provided a canister (7) for collection of titanium that has been purified due to the sublimation of volatiles.

The reactor also includes a deposition screw (8) and deposition retort (9). The deposition retort may extend into the sublimation screw (2). In this case the sublimation screw (2) may be shaftless. The deposition screw (8) may also be shaftless. It also follows that if an internal deposition retort is used the internal diameter of the deposition retort (9) is less than that of the sublimation retort (3). FIG. 1 shows the arrangement of the deposition screw (8) and deposition retort (9) and the sublimation screw (2) and sublimation retort (3) where external deposition retorts are employed.

An independent drive unit (10) is used to rotate the deposition screw (8) within the deposition retort (9). A vacuum line (6) connects with the deposition retort (9), and in turn is linked to a vacuum pump. The deposition retort (9) also includes a discharge outlet for collection of deposited material into a canister (11)

In use the apparatus is evacuated using vacuum pumps and purged with argon. The pressure in the system is generally 0.01 to 0.015 kPa. The retort (5) component of the apparatus is brought up to temperature (about 800° C.) using heating elements or the like. The sublimation screw (2) and deposition screw (8) are rotated. Process material is metered onto the sublimation screw (2) and is transported into the furnace portion of the apparatus. Under the prevailing pressure and temperature conditions volatiles present in the process material (primarily $MgCl_2$) are sublimed off thereby leaving purified titanium metal particles. These particles are transported the length of the sublimation retort and are discharged at the end of the retort and collected in a canister (7). The titanium particles may be used as is or subjected to further processing in accordance with the invention to enhance the purity by driving off further volatile species that may be present. Some light sintering of the titanium particles may occur and if it does this may actually be beneficial to reduce the reactivity of the ultrafine titanium particles.

Volatiles that sublime off the process material are drawn under vacuum into the deposition retorts (9) where the temperature is controlled to cause deposition. In this regard the deposition retort, or at least a part of it, may include a cooling sleeve (12). Typically, the temperature along the length of the deposition retort (9) will decrease away from the furnace (5). A temperature gradient ranging from 750° C. to 350° C. along the length of the deposition retort (9) may be suitable. Deposited solids on the inner surface of the deposition retorts (9) will be transported along the retort by the action of the deposition screws (8). At one end of the screws the deposited solids are discharged through a port provided in the retorts and collected in a canister (7).

FIGS. 2 and 3 illustrate a portion of a sublimation retort in the form of a tubular member. The sublimation retort (1) will include a sublimation screw but this is not illustrated in FIGS. 2 and 3. The interior of the sublimation retort (1), is connected to a deposition retort (2) via a port (3). The deposition retort takes the form of a tubular member. Typically, the deposition retort (2) meets the sublimation retort (1) at 90° but this is not essential. The deposition retort (2) includes a discharge outlet (4).

In FIG. 2 the deposition retort (2) includes a deposition screw (5) comprising a shaft (6) and screw threads (7).

In FIG. 3 the deposition retort (2) includes a central tubular member (9) that is fixed. In the annular space (10) between the tubular member (9) and the inner surface of the deposition retort (2) is provided a shaftless deposition screw (11) that rotates around the tubular member (9).

In use in the sublimation retort (1) volatiles are sublimed at high temperature and they are drawn into the deposition retort (2). If the temperature in the deposition retort is suitably low, volatiles will deposit as solids on surfaces within the retort (2). In FIGS. 2 and 3 deposited volatiles are identified by referent numeral 8. Rotation of the screw (5) will have the effect of scraping deposited volatiles (8) off the inside surface of the deposition retort (2) and transport it along the deposition retort (2) where the purified metal (8) will be discharged through outlet (4) for collection.

In FIG. 3 deposition will take place on the inner surface of the deposition retort (2) and the surface of the central tubular member (9). Deposited volatiles (8) will be scraped from the surfaces of the deposition retort (2) and tubular member (9) by the deposition screw (10) and transported along the deposition retort (2) for discharge at outlet (4).

The embodiments shown in FIGS. 2 and 3 will include the same additional componentry as shown in FIG. 1—the main difference between the embodiment of FIGS. 1-3 lies in the type of the deposition retort and deposition screw(s) employed. The mode of operation for the embodiments in FIGS. 2 and 3 essentially the same as in FIG. 1, subject of course to design modification for the deposition retort/deposition screw(s).

The apparatus used in the invention and components thereof are made of materials having suitable properties, and one skilled in the art would be familiar with materials to be used.

The following non-limiting example illustrates an embodiment of the present invention.

EXAMPLE

The apparatus used was a cylindrical sublimation retort made of 253MA stainless steel, 2.2 m in length with an internal diameter of 153 mm. The central section of the sublimation retort was placed in a 1300 mm long 14.4 kW, 3 zone, split furnace and heated to 870° C. The hot zone of the sublimation retort (a section above 750° C.) was 700 mm long. The feed section of the sublimation retort comprised a 50 mm port attached to a single auger powder feeder. The feed process material, a composite material containing Ti particles in a magnesium chloride matrix (20.1% Ti, 79.7% $MgCl_2$), sub 400 microns, was fed into the sublimation retort at a rate of 250 g/hr taking 8 minutes to pass through the hot zone.

At the outlet end of the sublimation retort was a 70 mm discharge pipe, allowing the Ti rich metal powder to fall through a ball and knife gate valve into a sealed metal tube. After a single pass, the metal power consisted of 99.3% Ti, 0.10% Mg and 0.30% Cl.

The sublimation retort was designed to operate under medium vacuum with minimal air ingress. The composite material was moved through the sublimation retort by a shaftless screw with a 90 mm pitch driven from the feed end at 1 to 10 rpm. The drive train consisted of an electric motor connected to a high ratio gear box and passing through a 3 chamber mechanical seal to ensuring minimal air ingress. The pressure within the sublimation retort was operated between 0.01 and 0.015 kPa. A purge gas of Ar was added at 5 mg/min as a barrier gas.

Magnesium chloride from the composite material that has sublimed within the hot zone is then removed from the sublimation retort through a 136 mm ID internal deposition retort running from the feed end of the sublimation retort through the centre of the shaftless screw to a point close to the hot zone where its entry point was located. The magnesium chloride sublimed in the hot zone in the sublimation retort was then pulled into the deposition retort via a vacuum pump connected to the end of the deposition retort. The magnesium chloride deposited rapidly on entry into the deposition retort. The deposition screw was used to transport the solid magnesium chloride powder through the deposition retort to a 50 mm discharge port and into a metal canister. The deposition screw was extended slightly past the entry point to prevent build-up of accretion on the entry to the deposition retort.

The apparatus was operated continuously over a 20 hour period generating approximately 0.9 kg of purified metal.

Many modifications will be apparent to those skilled in the art without departing from the scope of the present invention The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The claims defining the invention are as follows:

1. A process for recovering a metal from a process material comprising the metal and at least one component that is more volatile than the metal, which process comprises:
    transporting the process material in a retort provided in a single furnace, the retort being operated under vacuum and at a temperature sufficient to cause sublimation of the at least one component from the process material thereby producing purified metal as a solid, the process material comprising the metal and the at least one component which includes one or more volatile salts of another metal;
    depositing via deposition the at least one component that has been sublimed on a cool surface that is in continuous direct communication with the retort;
    removing the purified metal from the retort; and
    removing the at least one component that has been deposited on the cool surface from the cool surface, wherein the process is operated on a continuous basis with fresh process material being supplied to the retort and furnace, with the purified metal being removed continuously and with the at least one component deposited on the cool surface being removed continuously.

2. The process of claim 1, wherein the metal is selected from titanium, zirconium and hafnium and the process material is a reduction reaction product including the metal reduction reaction by-products.

3. The process of claim 1, wherein the metal is titanium and the process material is produced by reduction of titanium tetrachloride with magnesium.

4. The process of claim 1, wherein the process material is transported in the retort using a rotating screw.

5. The process of claim 1, wherein a temperature gradient is provided so that process material transported in the retort is transported into a hot zone where sublimation of the at least one component from the process material takes place.

6. The process of claim 1, wherein multiple components that are more volatile than the metal are removed from the process material via sublimation and deposition.

7. The process of claim 1, wherein the process material is in particulate form.

8. The process of claim 7, wherein temperature and pressure is controlled to avoid formation of liquid phases.

* * * * *